United States Patent [19]
Webb

[11] Patent Number: 6,163,394
[45] Date of Patent: Dec. 19, 2000

[54] OPTICAL SIGNAL TRANSMITTER, SYSTEM AND METHOD OF TRANSMISSION

[75] Inventor: Stephen Michael Webb, Kent, United Kingdom

[73] Assignee: Alcatel Alsthom Compagnie Generale d'Electriicite, Paris, France

[21] Appl. No.: 08/945,932

[22] PCT Filed: Feb. 28, 1997

[86] PCT No.: PCT/GB97/00566

§ 371 Date: Feb. 12, 1998

§ 102(e) Date: Feb. 12, 1998

[87] PCT Pub. No.: WO97/32410

PCT Pub. Date: Sep. 4, 1997

[30] Foreign Application Priority Data

Feb. 29, 1996 [GB] United Kingdom .................. 9604303

[51] Int. Cl.[7] .................................................. H04B 10/04
[52] U.S. Cl. .......................... 359/181; 359/158; 359/161; 359/183
[58] Field of Search .................................. 359/158, 161, 359/181, 183

[56] References Cited

U.S. PATENT DOCUMENTS

| | | | |
|---|---|---|---|
| 5,473,458 | 12/1995 | Mamyshev et al. | 359/161 |
| 5,515,196 | 5/1996 | Kitajima et al. | 359/180 |
| 5,717,510 | 2/1998 | Ishikawa et al. | 359/161 |
| 5,912,755 | 6/1999 | Bergano | 359/181 |

FOREIGN PATENT DOCUMENTS

| | | |
|---|---|---|
| 0539177A | 4/1993 | European Pat. Off. . |
| 0565035A | 10/1993 | European Pat. Off. . |

OTHER PUBLICATIONS

Patent Abstracts of Japan, vol. 095, No. 004, May 31, 1995 (JP–07–007475 A).

Patent Abstracts of Japan, vol. 095, No. 001, Feb. 28, 1995 (JP–06–303205 A).

*Primary Examiner*—Leslie Pascal
*Assistant Examiner*—Hanh Phan
*Attorney, Agent, or Firm*—Sughrue, Mion, Zinn, Macpeak & Seas, PLLC

[57] ABSTRACT

An optical signal transmitter (10) is constituted by a coherent light generator (12) for generating a carrier wavelength and a modulator apparatus (16, 32) coupled with the output of the light generator. The modulator apparatus has a series arrangement of an optical intensity modulator (16) and an optical phase modulator (32) coupled between the input and an output of the modulator means. The intensity modulator (16) has an input (26) for a non return to zero (NRZ) digital signal of a predetermined data rate as defined by a clock generator. The phase modulator (32) has an input coupled with the clock generator which provides pulses to the phase modulator at the data rate, or at an even multiple of the data rate, but phase shifted relative to the data signal such that one end of each digital period is red shifted and the other end is blue shifted to facilitate detection.

9 Claims, 3 Drawing Sheets

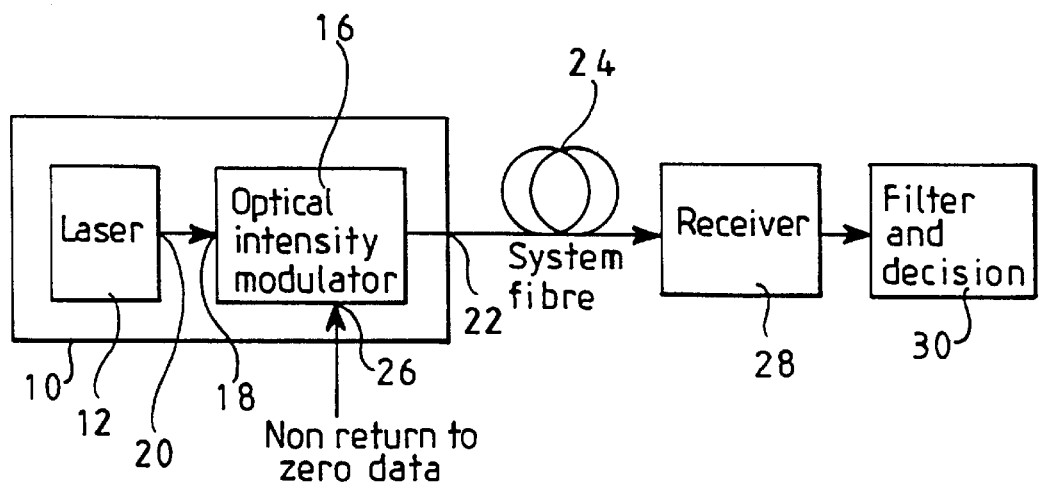
FIG 1  PRIOR ART
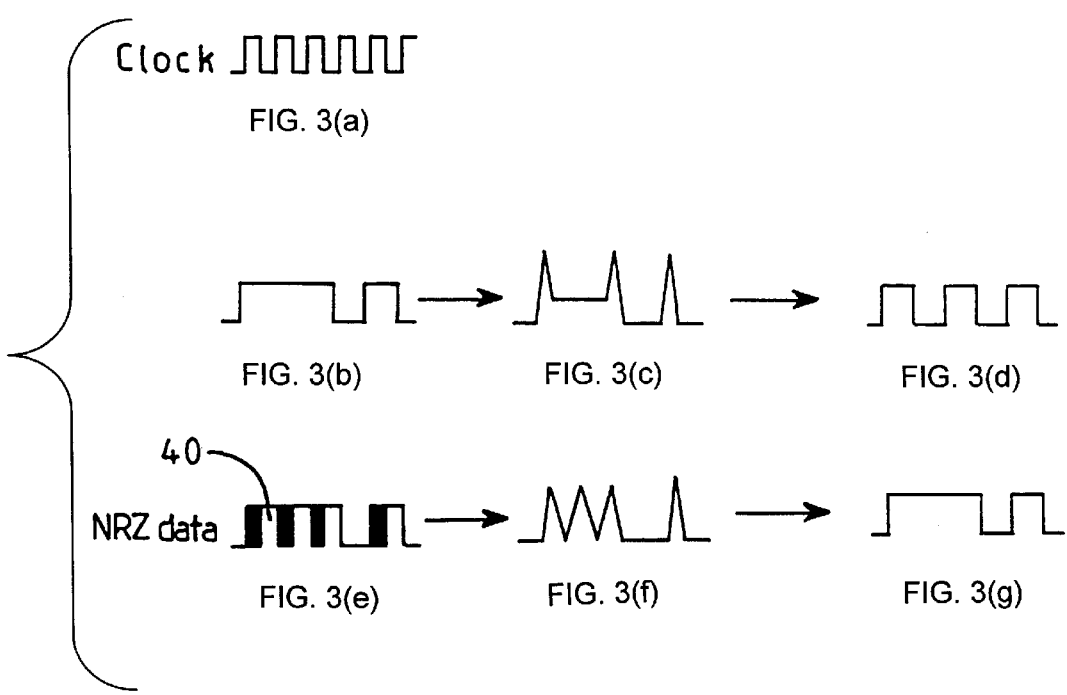

OPTICAL SIGNAL TRANSMITTER, SYSTEM AND METHOD OF TRANSMISSION

BACKGROUND OF THE INVENTION

This invention relates to optical data transmission and more particularly to non return to zero (NRZ) transmission of data.

When traffic is applied to an optical transmission line in NRZ format with a high launch power (typically >+18 dBm), non linear distortion is introduced by self phase modulation (SPM) causing transmission errors in the subsequent receiver at the remote end of the TX line. The distortion manifests itself by converting transitions in the data into peaks and suppressing the level of the intermediate data. Thus the receiver is more likely to detect these peaks and ignore the intermediate data. The present invention seeks to overcome or at least enable substantial reduction of errors in detection of NRZ signals.

SUMMARY OF THE INVENTION

According to one aspect of the invention there is provided an optical signal transmitter comprising a coherent light generator for generating a carrier wavelength and a modulating means coupled with the output of the light generator the modulating means having a series arrangement of an optical intensity modulator and an optical phase modulator coupled between the input and an output of the modulating means, the intensity modulator having an input for a non return to zero (NRZ) digital signal of a predetermined data rate as defined by a clock generator and the phase modulator having an input coupled with the clock generator which provides pulses to the phase modulator at the data rate, or at an even multiple of the data rate, bit phase shifted relative to the data signal such that one end of each digital data period is red shifted and the other end is blue shifted to facilitate detection.

The improvement in detection results because symmetrical distortion occurs as a result of transmission and all data is effectively distorted equally as a result of transmission along the fibre.

The pulses applied to the phase modulator may be at the data rate and at a phase shift relative to the data signal such that one half of each digital data period is red shifted and the other half is blue shifted.

The transmitter may comprise a phase shifter connected between the clock generator and the input to the phase modulator to effect the relative phase displacement between the data pulse signals and the pulses applied to the phase modulator. The phase shifter may be adjustable to permit optimum adjustment of relative phase between the data pulse signal and the pulses applied to the phase modulator.

The clock generator may typically operate at 2.5 Gbit/sec.

The transmitter may include an optical signal amplifier wherein the output of the modulating means is coupled to the input of the optical signal amplifier the output of which amplifier provides an amplified signal for connection to an optical fibre transmission line.

According to another aspect of the invention there is provided an optical signal transmission system comprising a transmitter, as hereinbefore described, coupled via an optical fibre transmission line to a receiver and detector. The detector may comprise a filter and decision circuit.

According to another aspect of the invention there is provided a method of transmitting optical signals in which a coherent carrier wavelength is intensity modulated with a non return to zero digital data signal, wherein the signal data is phase modulated such that one end of each of the digital data pulse periods is red shifted and the other end of each of the data pulse periods is blue shifted thereby to facilitate detection at a receiver.

BRIEF DESCRIPTION OF THE DRAWINGS

In order that the invention and its various other preferred features may be understood more easily, some embodiments thereof will now be described, by way of example only, with reference to the drawings in which:

FIG. 1 is a schematic block diagram illustrating a transmission system not employing the present invention, FIG. 3a illustrates a clock waveform employed in FIGS. 1 and 2, FIGS. 3b, 3c & 3d illustrate signal waveforms at different positions along the transmission system of FIG. 1, FIGS. 3e, 3f & 3g illustrate signal waveforms at positions along the transmission system of FIG. 2 similar to the positions in FIGS. 3b, 3c and 3d.

DETAILED DESCRIPTION OF A PREFERRED EMBODIMENT

Figure 2:
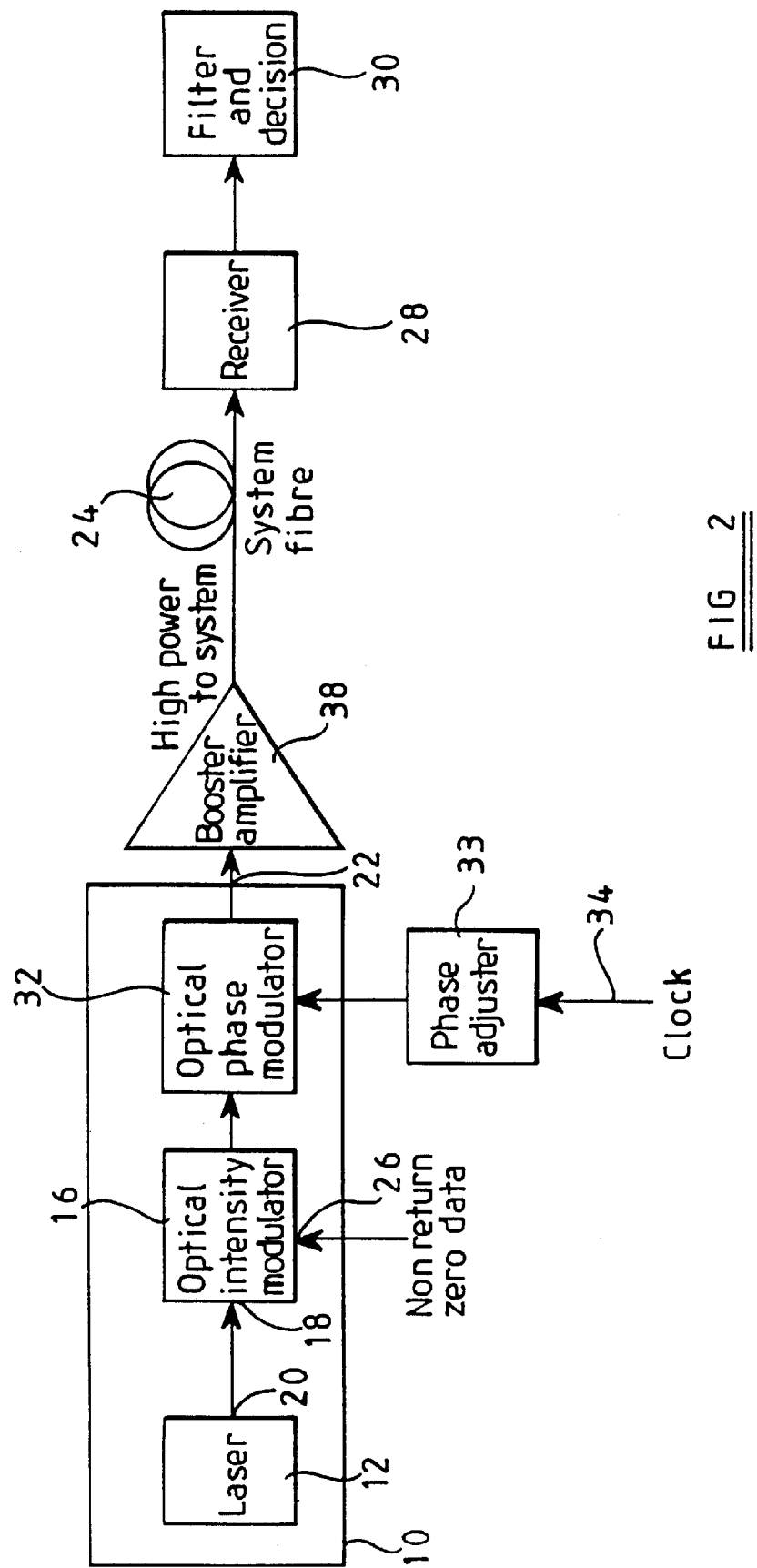
FIG. 2 is a schematic block diagram illustrating a transmitter and transmission system constructed in accordance with the invention and operating in accordance with the method of the invention.

Throughout the drawings the same reference numerals will be used to identify similar points in order to simplify the description and avoid repetition.

Referring now to FIG. 1 a transmission system comprises a transmitter including a coherent light generator in the form of a laser 12, providing an output at a wavelength typically of 1555 nm, and an optical intensity modulator 16 having an input 18, coupled to the output 20 of the laser, and an output 22 coupled to a system fibre 24. The modulator has a second input 26 for receiving an NRZ digital traffic signal which modulates the coherent light signal from the laser. At a remote end of the system fibre there is provided a receiver 28 followed by an electrical filter and decision circuit 30.

Referring now to FIG. 3a there is shown a digital clock signal operating typically at 2.5 Gbit/sec and the non return to zero data is generated at this clock rate. FIG. 3b illustrates a sample part of a NRZ signal provided at input 26 to the modulator 16 and it can be seen to consist of a broad pulse representative of three same digits followed by an opposite digit and then a same digit. FIG. 3c shows the waveform produced at the output of the receiver 28 when subjected to the distortion introduced by the optical line due to high launch power (>+18 dBm) typically) and it will be seen that this exhibits peaks only at transitions between one digit type and the other digit type. When this signal is passed into the filter and decision circuit 30 it is likely to detect each of the peaks as one digit type and as can be seen the digital signal recovered at the receiving end differs from that which was sent by the transmitter resulting in transmission errors.

Referring now to FIG. 2 it can be seen that into the coupled in series with the intensity modulator between the output 20 of the laser 12 and the output 22 of the transmitter. The phase modulator is used to apply chromatic pre-chirp to the NRZ transmitter. Although the phase modulator is shown as following the intensity modulator the opposite sequence of device works equally well.

A clock signal on line 34, such as is illustrated in FIG. 3a, at 2.5 Gbit/sec derived from the same clock as is used to derive the data, is fed via a phase adjuster 3b e.g. a mechanical trombone device, to input 36 of the phase modulator. The output 22 of the transmitter is coupled via a booster amplifier 38 to the system fibre 24. The phase of the clock signal applied to the phase modulator is adjusted by the phase adjuster so that one half of a data ONE is red shifted and the other half is blue shifted. The effect of the phase modulation can be seen from FIGS. 3b, 3e, 3f and 3g. Applying the same sample part of an NRZ data signal illustrated in FIG. 3b to the input 26 of the optical intensity modulation 16 there results at the output 22 of the transmitter the waveform illustrated in FIG. 3e where the data ONE periods 40 exhibit the optical chirp provided by the phase modulator by adjusting the level of chirp and optimising the phase adjustment, symmetrical distortion is introduced for each one digit after transmission. The receiver 28 can now detect each of the ONE signals and provides an output peak corresponding to each one digit as is illustrated in FIG. 3f. When this signal is passed through the filter and decision circuit the waveform provided is as illustrated in FIG. 3g which can be seen to replicate the signal 3b and accordingly the data signal is received without error.

The addition of phase modulation to the transmitter signal also helps to reduce the onset of stimulated Brillouin Scattering (SBS) because of the increased linewidth from the transmitter. This enables the power provided at the output of the booster amplifier 38 to be significantly increased before scattering occurs and permits a significant increase in distance over which transmission can be successfully accomplished without requiring remote optically pumped amplifiers thereby enhancing unrepeatered transmission systems. The system has been found to be effective over 400 km of straight fibre at 2.5 Gbit/sec with +26.5 dBm (450mW) launch power.

A suitable phase modulator is a lithium niobate MachZender type.

Although the clock signal in the embodiment of FIG. 2 is shown to be coupled via a phase adjuster which permits control of the phase for optimum reduction of errors at the receiver it will be appreciated that a predetermined delay line coupling between the clock and the phase modulator may be provided to achieve the desired effect.

Although the embodiment described in connection with FIG. 2 employs a drive to the modulator at the clock rate at which the data signal is derived it is also possible to drive the modulator at an even multiple of the clock rate.

Figure 4:
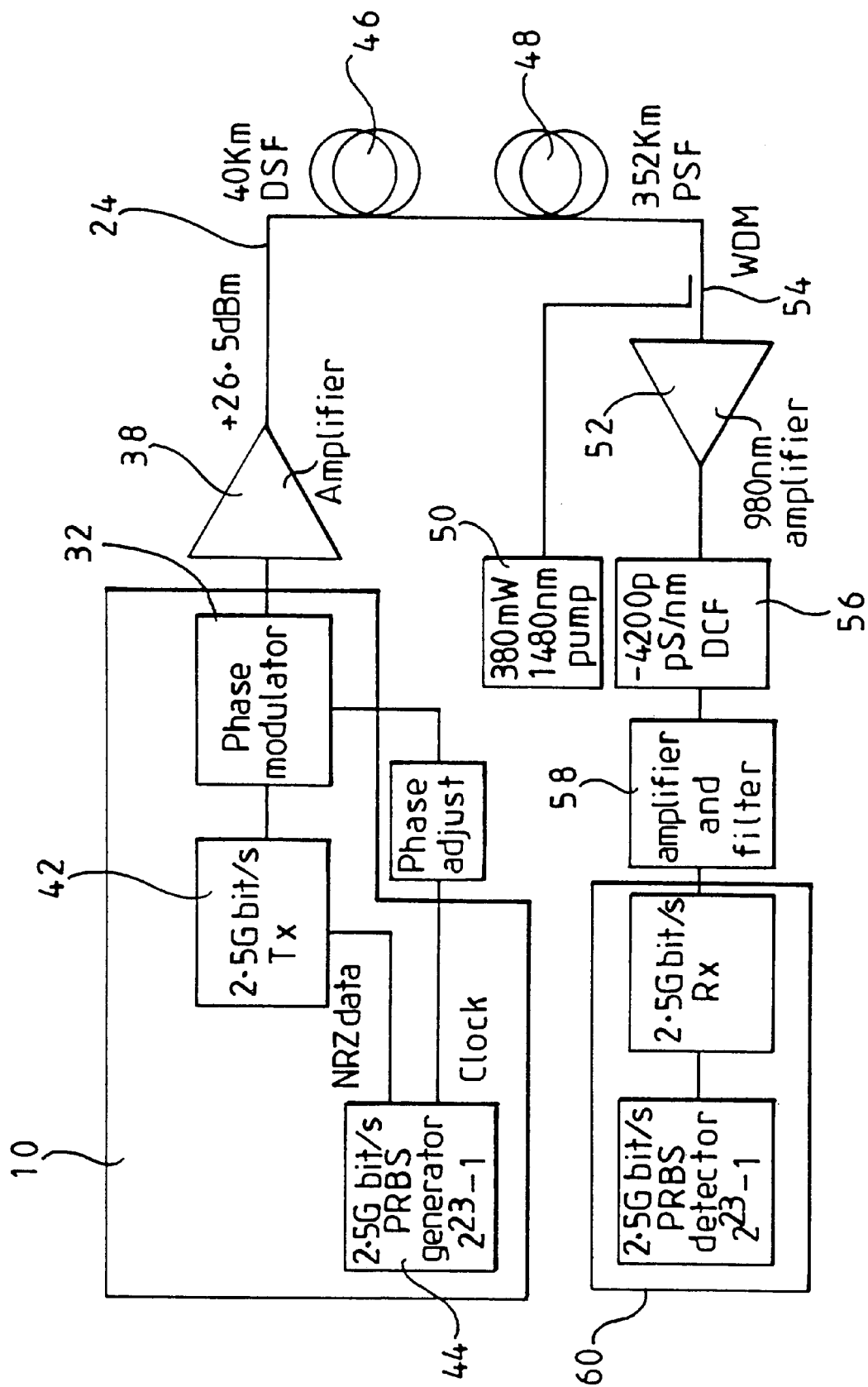
FIG. 4 is a schematic block diagram of a practical system constructed in accordance with the invention.

A further embodiment of the invention is illustrated in FIG. 4 to provide more detail of a practical system. A 2.5 Gbit/sec transmitter 10 comprises a 155 nm DFB laser 42 including a lithium niobate Mach-Zender modulator driven from an amplifier. To further alleviate SBS, the laser linewidth is spectrally broadened by applying a small signal to its input. A lithium niobate phase modulator 32 driven by the 2.5 GHz clock 44 is arranged immediately after the laser in order to provide adjustable pre-chirp for self phase modulation (SPM) control and to further suppress SBS. The phase of the pre-chirp adjustable with respect to the transmitted data such that optimum reception is achieved. A concatenated post-amplifier 38 is used to boost the signal to +26.5 dBm before launching into the system fibre 24.

The first section of the system fibre 46 is 40 km of long $\lambda_0$ dispersion shifted fibre (DSF) such that the high power signal is transmitted in the normal dispersion regime, thereby eliminating modulation instability (MI). The remaining section 48 of system fibre is of length 352 km and is low loss pure silica cored fibre (PSF) with a mean loss of 0.176 dB/km and 20 ps/nm dispersion.

Raman preamplification is achieved by means of a pump 50 at 1480 nm which multiplexes 380 mW of pump power with the signal at the receiver end preceding a preamplifier 52. The amplifier 52 which follows a wavelength division multiplexer (WDM) 54 is a low noise, 980 nm pumped amplifier (noise figure of 3.5 dB in this example) followed by a dispersion compensating fibre (DCF) 56 offering a total of −4200 ps/nm. The signal is passed through an amplifier and optical filter 58 before being detected by an avalanche photodiode (APD) electrical receiver 60.

Accordingly the invention can enable the effect of self phase modulation (SPM) to be reduced. SPM is detrimental when a high launch power (>+18 dBm typically) is launched in an unrepeatered system. SPM introduces distortion mainly on the transitions of NRZ data (spikey peaks). The invention introduces a controlled amount of pre-chirp on the light such that as it travels down dispersive fibre, the front edge travels slightly faster and the back edge slightly slower—speed is a function of colour (SPM spikes are caused by the light going slower on front and faster on the back edge, bunching the pulse up giving peaks). Additionally the invention causes '1's in the middle to become peaks by artificially making some light go fast and some slow. The net result is all '1's are turned into similar sized peaks after non-linear transmission through the fibre. The peaks are detected by the RX and due to the low-pass electrical filter they are integrated into NRZ data.

What is claimed is:

1. An optical signal transmitter (10) comprising a coherent light generator (12) for generating a carrier wavelength and a modulating means coupled with the output of the light generator, the modulating means having a series arrangement of an optical intensity modulator (16) and an optical phase modulator (32) coupled between the input and an output of the modulating means, the intensity modulator having an input (26) for a non return to zero (NRZ) digital signal of a predetermined data rate as defined by a clock generator, the phase modulator (32) having an input (36) coupled with the clock generator which provides pulses to the phase modulator at the data rate, or at an even multiple of the data rate, bit phase shifted relative to the data signal such that one end of each digital data period is red shifted and the other end is blue shifted so as to cause the speed of the front end of each digital data period to increase and the speed of the back end of each digital data period to decrease upon transmission along an optical transmission line to facilitate detection.

2. A transmitter as claimed in claim 1, wherein the pulses provided to the phase modulator (32) are at the data rate and at a phase shift relative to the data signal such that one half of each digital data period is red shifted and the other half is blue shifted.

3. A transmitter as claimed in claim 1, further comprising a phase shifter (32) connected between the clock generator and the input to the phase modulator to effect the relative phase displacement between the data pulse signals and the pulses applied to the phase modulator.

4. A transmitter as claimed in claim 3, wherein the phase shifter (32) is adjustable to permit optimum adjustment of relative phase between the data pulse signal and the pulses applied to the phase modulator.

5. A transmitter as claimed in claim 1, wherein the clock generator operates at 2.5 G.bit/sec.

6. A transmitter as claimed in claim 1, further including an optical signal amplifier (38) wherein the output of the modulating means is coupled to the input of the optical signal amplifier, an output of said optical signal amplifier providing an amplified signal for connection to an optical fibre transmission line.

7. An optical signal transmission system, comprising:

an optical fibre transmission line (24);

a receiver (26);

a detector (30); and an optical signal transmitter (10), coupled via said optical fibre transmission line to said receiver and said detector, said transmitter comprising a coherent light generator (12) for generating a carrier wavelength and a modulating means coupled with the output of the light generator, the modulating means having a series arrangement of an optical intensity modulator (16) and an optical phase modulator (32) coupled between the input and an output of the modulating means, the intensity modulator having an input (26) for a non return to zero (NRZ) digital signal of a predetermined data rate as defined by a clock generator, the phase modulator (32) having an input (36) coupled with the clock generator which provides pulses to the phase modulator at the data rate, or at an even multiple of the data rate, bit phase shifted relative to the data signal such that one end of each digital data period is red shifted and the other end is blue shifted so as to cause the speed of the front end of each digital data period to increase and the speed of the back end of each digital data period to decrease upon transmission along an optical transmission line to facilitate detection.

8. A system as claimed in claim 7, wherein the detector (30) comprises an electrical filter and decision circuit.

9. A method of transmitting optical signals in which a coherent carrier wavelength is intensity modulated with a non return to zero digital data signal, wherein the signal data is phase modulated such that one end of each of the digital data pulse periods is red shifted and the other end of each of the data pulse periods is blue shifted,thereby to facilitate detection at a receiver.

* * * * *